Dec. 24, 1968 R. W. STRACHAN 3,418,531

PROTECTIVE APPARATUS FOR A FORCED AIR COOLING SYSTEM

Filed Dec. 6, 1965 2 Sheets-Sheet 1

Richard W. Strachan,
Inventor.

Koenig, Senniger, Powers and Leavitt,
Attorneys.

Richard W. Strachan,
Inventor.
Koenig, Senniger, Powers and Leavitt,
Attorneys.

United States Patent Office 3,418,531
Patented Dec. 24, 1968

3,418,531

PROTECTIVE APPARATUS FOR A FORCED AIR COOLING SYSTEM

Richard W. Strachan, Providence, R.I., assignor to Texas Instruments Incorporated, Dallas, Tex., a corporation of Delaware Filed Dec. 6, 1965, Ser. No. 511,601
8 Claims. (Cl. 317—41)

ABSTRACT OF THE DISCLOSURE

Protective apparatus for a forced air cooling system is disclosed in which a self-heating NTC thermistor is mounted in the air flow to be cooled thereby. A relay controls the energization of a load being cooled by the air flow and the operating winding of the relay is connected in series with the thermistor across an electric power source providing a predetermined voltage. The thermal and electrical dissipation characteristics of the thermistor are chosen in relation to the source voltage and the load impedance presented by the relay winding to cause the thermistor to heat regeneratively when the cooling air flow is attenuated. Upon such regenerative heating the increased resistance of the thermistor deenergizes the relay and the load controlled thereby.

This invention relates to protective apparatus for use in a forced air system which cools a dissipative electrical load, and more particularly to such apparatus which deenergizes the load when the flow of coolant is attenuated or cut off.

In optical projection systems which must illuminate a large screen, the projection lamp dissipates substantial power as heat, as well as generating the projection light. Typically, forced air cooling is provided to remove heat from the projector. However, a substantial danger exists in that, if the air blower fails or if the air ports are inadvertently obstructed, the desired cooling effect may be lost and very high temperatures may be generated within the projector itself. These high temperatures can damage the lenses or other optical elements of the projector or can destroy the record or transparency being projected, which record may well be irreplaceable. In any event, excessive heat will lead to an early failure of the projection lamp.

Among the several objects of the present invention may be noted the provision of simple and relatively inexpensive protective apparatus which will deenergize an air-cooled electrical load if the supply of cooling air is attenuated; the provision of such a system which will respond quickly in the event of air flow stoppage; and the provision of such apparatus which is relatively sensitive and reliable, employing solid state components. Other objects and features will be in part apparent and in part pointed out hereinafter.

Briefly, protective apparatus according to the invention is operative to deenergize an air-cooled dissipative electrical load in the event of attenuation or obstruction of the cooling air flow. The protective apparatus includes an NTC thermistor adapted to be mounted in the cooling air flow to be also cooled thereby, and switching means for selectively energizing the dissipative electrical load. The switching means includes an electrical actuator having a predetermined load impedance. The actuator is adapted, when energized, to actuate said switching means for deenergizing the load. The actuator and the thermistor are connected in series across a source of electrical power providing a predetermined voltage for heating the thermistor. The thermal and electrical dissipation characteristics of the thermistor are chosen relative to the values of the voltage and the load impedance. Thus when adequate cooling air is flowing past the load, the thermistor remains relatively cool. When the air flow is attenuated, the thermistor heats regeneratively to provide a relatively low impedance in series with the actuator, whereby the switching means is actuated to deenergize the load.

The invention accordingly comprises the apparatus hereinafter described, the scope of the invention being indicated in the following claims.

In the accompanying drawings, in which one of various possible embodiments of the invention is illustrated:

Corresponding reference characters indicate corresponding parts throughout the several views of the drawings.

Figure 1:
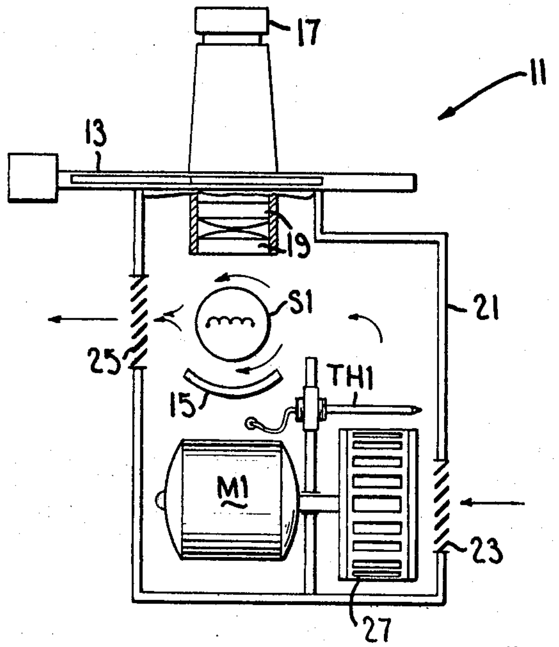
FIG. 1 is a diagrammatic plan view, partially in section, of an optical slide projector which incorporates forced air cooling of the projection lamp and protective apparatus according to the present invention.

Referring now to FIG. 1, there is indicated at 11 a slide projector of generally conventional construction. Projector 11 includes a slide holding and changing mechanism 13 and a light source such as the projection lamp S1 which is provided with a reflector 15 for concentrating light emitted by the lamp. An adjustable projection lens 17 is provided for projecting an image of a slide held in mechanism 13 and, for this purpose, light emitted from lamp S1 is converged on lens 17 by a pair of condenser lenses 19. Lamp S1 is mounted within a housing 21 which is provided with an air inlet louver 23 and an air outlet louver 25. Air is forced through the housing 21 and past lamp S1 by a centrifugal squirrel cage blower 27 driven by a motor M1. An elongate thermistor TH1 is mounted in housing 21 adjacent blower 27 and in the path of the lamp cooling air so as also to be cooled thereby.

As is explained in greater detail hereinafter, the solid state sensor constituted by thermistor TH1 is operated in a self-heating mode. For this purpose, thermistor TH1 is of the NTC (negative temperature coefficient) resistivity type and is preferably of the coaxial construction shown in FIG. 2. The sensing portion of thermistor TH1 includes a metallic outer tubular casing 29 and a metallic central core 31 which is coaxial with casing 29. The space between casing 29 and core 31 is filled with a semiconductor material 33 having a negative temperature coefficient of resistivity. A preferred form of thermistor TH1 and the method of making such an element are disclosed in copending, coassigned application Ser. No. 331,712, filed Dec. 19, 1963, by Harry M. Landis and Joseph W. Waseleski, Jr., and entitled, Temperature Sensors and Their Manufacture, and issued as U.S. Patent 3,266,001. As disclosed in that application, a coaxial NTC thermistor element can be constructed by filling the space between a tubular casing and a coaxial core with lanthanum-doped barium titanate in particulate form and then swaging the resultant structure in conventional rotary swaging apparatus to substantially reduce its diameter and to compact the barium titanate until its conductivity attains a value which is not less than approximately 50% of its theoretical conductivity. Although particulate lanthanum-doped barium titanate normally has a positive temperature coefficient (PTC) of resistivity, the swaging process produces changes in its resistivity characteristics which give the resultant swaged coaxial thermistor element a negative temperature coefficient of resistance particularly useful in the present invention. Other NTC materials may also be used.

Thermistor TH1 is supported by a bushing 35 which permits it to be conveniently mounted on a wall of housing 21. One end of coaxial thermistor TH1 is sealed by being crimped and welded as indicated at 34. Suitable insulated leads 37 and 39 are welded to casing 29 and core 31, respectively, and the open end of the coaxial thermistor element is sealed by being potted with a suitable encapsulant as indicated at 41.

Figures 2, 3:
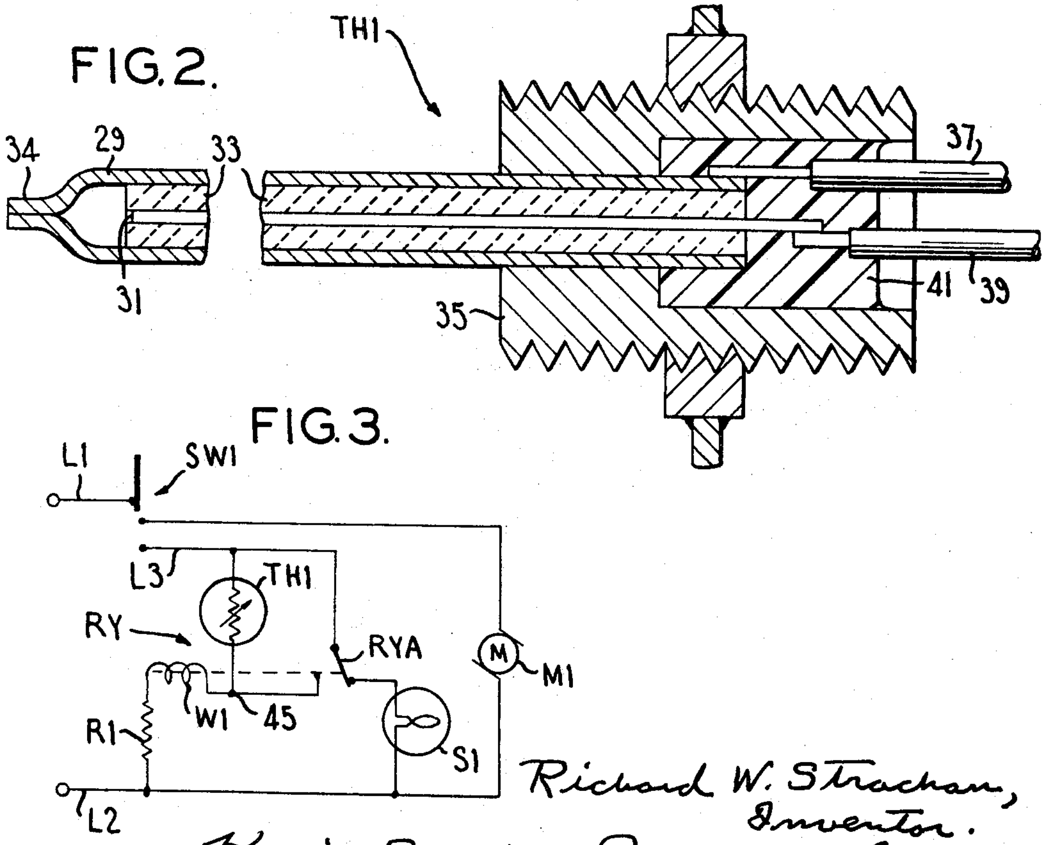
FIG. 2 is an enlarged sectional view of a thermistor employed in the apparatus of FIG. 1.
FIG. 3 is a schematic circuit diagram of the air flow protective apparatus included in the projector of FIG. 1.

Referring now to FIG. 3, electric power at a predetermined voltage $V_S$ is supplied to projector 11 through a pair of leads L1 and L2 from a suitable source of conventional supply mains (not shown). A shorting type bar switch SW1 is provided for selectively connecting lead L1 to the blower motor M1 alone or to both motor M1 and, through a lead L3, to the lamp circuit which is described in greater detail hereinafter.

The lamp circuit includes switching means constituted by a conventional electromagnetic relay RY. Relay RY includes a single pole, double throw contact arrangement RYA and a winding W1. Winding W1 actuates contacts RYA to the position opposite that shown in FIG. 3 when the current through the winding exceeds an energization current threshold value $I_E$ and releases the contacts when the current drops below a deenergization current threshold $I_D$ which is lower than $I_E$.

Thermistor TH1, winding W1 and a current limiting resistor R1 are connected in series across leads L3 and L2. The normally open side of contacts RYA is connected to this series string at a junction 45 which is between thermistor TH1 and relay actuating winding W1. The normally closed side of contacts RYA energizes the projection lamp S1 from lead L3 when the winding W1 is not energized.

As is understood by those skilled in the art, thermistors having a negative temperature coefficient of resistivity have an equilibrium current-voltage characteristic which is peaked and which includes a positive resistance region at relatively low current levels and a negative resistance region at relatively high current levels. The negative resistance portion of the characteristic is caused by the regenerative power dissipation which occurs at high temperatures. In this region, the drop in resistance which accompanies a rise in temperature causes an increased amount of power to be dissipated within the thermistor itself, the increase in dissipation being sufficient to cause a further rise in temperature. Accordingly, if the current provided to an NTC thermistor is not limited by external circuit resistance, a run-away thermal situation can develop which may lead to the destruction of the thermistor.

The particular current-voltage characteristics of a given thermistor element depend not only upon the type of semiconductor material used but also upon the heat-dissipating capacity of the thermistor configuration. The elongate coaxial thermistor construction shown in FIGS. 1 and 2 has an inherently high heat-dissipating capacity due to its high ratio of surface area to mass. Because of this high ratio of surface to mass, the heat-dissipating capacity of thermistor TH1 is also highly dependent upon the behavior of the surrounding environment or media to which heat can be transmitted, in this case the temperature and velocity of the cooling air propelled by blower 27.

Figure 4:
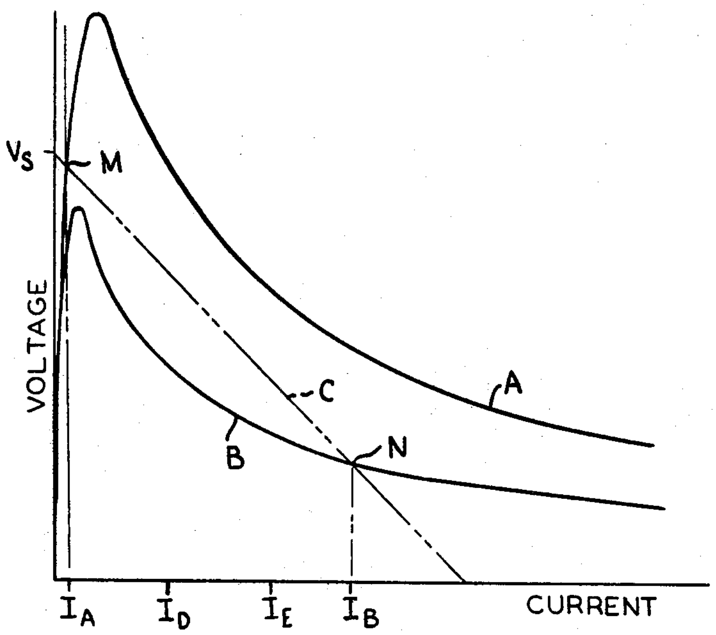
FIG. 4 is a graph representing the thermal and electrical equilibrium characteristics of the thermistor shown in FIG. 2 in relation to a predetermined load impedance.

In FIG. 4 the current-voltage characteristic of thermistor TH1 when it is exposed to fast moving air is represented by the curve indicated at A. The current-voltage characteristic of thermistor TH1 when it is in still air is represented by the curve indicated at B. It should be understood that these curves represent thermal equilibrium conditions for thermistor TH1 for each point on the curves. At a given temperature, thermistor TH1 will dissipate more power when it is in fast moving air than when it is in still air. Therefore, curve A lies above the curve B. In this regard, it may be useful to note that the resistance of thermistor TH1 at a given point on either of the curves A and B is measured by the slope of a line extending from the origin of the graph to that point.

The graph of FIG. 4 includes also a load line C, the slope of which represents the combined impedances of the relay actuating winding W1 and resistor R1. Load line C intersects the ordinate of the graph of FIG. 4 at a point corresponding to the voltage $V_S$ provided to the system by the lines L1 and L2. The values of voltage $V_S$, the impedance of winding W1 and the thermal and electrical equilibrium characteristics of thermistor TH1 are chosen in relation to each other such that load line C intersects the positive resistance region of curve A at point M, thereby providing a quite low current level $I_A$ when the probe is cooled by fast moving air, and such that the curve C intersects the curve B in the negative resistance region at point N, thereby providing a relatively high level of equilibrium current $I_B$ when the probe is in still air. Equilibrium current $I_A$ is well below the deenergization threshold $I_D$ while equilibrium current $I_B$ is above the energization current threshold $I_E$.

The operation of this apparatus is accordingly as follows:

When power is applied to the leads L1 and L2, and switch SW1 is closed so that power is applied to both blower motor M1 and to the lamp circuit, a portion of the supply voltage $V_S$ is impressed across thermistor TH1. Thermistor TH1 self-heats, due to internal electrical dissipation, but as long as the thermistor is surrounded by rapidly moving air, there is sufficient cooling so that thermal and electrical equilibrium is reached at a low level of current $I_A$. This current level is below the energization current threshold $I_E$ of the relay actuating coil winding W1 and accordingly the relay remains deactuated and the projection lamp S1 remains energized.

If, however, the supply of forced cooling air is attenuated or cut off, either by a failure of motor M1 or by a blockage of one or the other of the louvers 23 and 25, the thermal and electrical dissipation characteristics of thermistor TH1 will change and a new equilibrium point will be sought. Thermistor TH1 will heat regeneratively until a high level of current $I_B$ through the thermistor and relay winding W1 is reached. Current level $I_B$ is above the energization current threshold level $I_E$ and thus the relay actuating winding W1 is energized to swing the movable arm of contacts RYA from the normally closed side to the normally open side. The projection lamp S1 is thus deenergized and, simultaneously, lead L3 is connected directly to the relay winding W1, shunting the the thermistor TH1. A holding circuit for relay RY is thus established so that, as the thermistor TH1 cools down, the system will not recycle repetitively.

It should be noted that by employing the opposite resistance regions of the NTC thermistor characteristics, it is possible to obtain equilibrium currents which are widely different for the moving and still air situations. Thus relay RY may be satisfactorily operated directly by thermistor TH1.

Since thermistor TH1 has a high ratio of surface area to thermal mass, it is capable of a quite rapid response to changes in air velocity and thus this system provides a very rapid protection which protects the optical elements of projector 11 and also the transparency or other record whose image is being displayed.

After the particular trouble which initiated the shutdown has been cleared, the system may be reset merely by returning the switch SW1 briefly to its off position so that the relay RY releases and the lamp S1 is again connected to lead L3.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:

1. In a forced air cooling system for an electrical load dissipating substantial power, protective apparatus for deenergizing said load in the event of attenuation of the cooling air flow, said apparatus comprising:

an NTC thermistor adapted to be mounted in the air flow to be cooled thereby;

switching means for selectively energizing said load, said switching means including an actuator having a predetermined load impedance and being adapted when energized to actuate said switching means to deenergize said load; and circuit means for serially connecting said actuator and said thermistor across a source of electrical power providing a predetermined voltage for operating said thermistor, said thermistor in a self-heating mode having thermal and electrical dissipation characteristics relative to the values of said voltage and said load impedance such that, when adequate cooling air is flowing by said load, said thermistor remains relatively cool, and such that when said air flow is attenuated, said thermistor heats regeneratively to provide a relatively low impedance in series with said actuator whereby said switching means is actuated to deenergize said load.

2. Protective apparatus as set forth in claim 1 wherein actuation of said switching means establishes a holding circuit for said actuator for preventing deactuation of said switching means upon subsequent cooling of said thermistor.

3. Protective apparatus as set forth in claim 1 wherein said thermistor includes a conductive outer casing, a conductive central core coaxial with said casing and a filling of a semiconductor material having a negative temperature coefficient of resistivity between said casing and said core.

4. Protective apparatus as set forth in claim 3 wherein said materials comprise doped barium titanate compacted to effect a conductivity therein which is not less than 50% of the theoretical conductivity.

5. Protective apparatus as set forth in claim 4 wherein said probe is of swaged coaxial construction, the compaction of said barium titanate being effected by the swaging.

6. In an optical image projector having a projection light source which dissipates substantial heat and a blower for propelling a stream of cooling air past said source, protective apparatus for deenergizing said source in the event of attenuation of the cooling air flow, said apparatus comprising:

an NTC thermistor adapted to be mounted in the cooling air stream to be cooled thereby;

a relay including contacts for selectively energizing said load and an actuating winding having a predetermined load impedance and being adapted when energized to actuate said contacts to deenergize said load; and circuit means for serially connecting said winding and said thermistor across a source of electrical power providing a predetermined voltage for operating said thermistor, said thermistor in a self-heating mode having thermal and electrical dissipation characteristics relative to the values of said voltage and said load impedance such that, when adequate cooling air is flowing by said source, said thermistor remains relatively cool and, when said air flow is attenuated, said thermistor heats regeneratively to provide a relatively low impedance in series with said winding whereby said winding is energized thereby actuating said contacts to deenergize said source.

7. Protective apparatus as set forth in claim 6 wherein said relay includes contact for shunting said thermistor when said winding is energized thereby establishing a holding circuit which maintains said source deenergized upon subsequent cooling of said thermistor.

8. Protective apparatus as set forth in claim 7 including a switch having a first position in which both said source and said blower are deenergized, a second position in which said blower is energized and said source is deenergized, and a third position in which said blower is energized and said source is energized through said relay contacts.

References Cited

UNITED STATES PATENTS

| | | | |
|---|---|---|---|
| 2,475,343 | 7/1949 | Wellman | 317—40 X |
| 3,017,564 | 1/1962 | Barney | 317—41 X |
| 3,112,435 | 11/1963 | Barney | 317—41 X |

FOREIGN PATENTS 483,039 4/1938 Great Britain.

JOHN F. COUCH, *Primary Examiner.*

R. V. LUPO, *Assistant Examiner.*

U.S. Cl. X.R.

317—40, 13

UNITED STATES PATENT OFFICE

CERTIFICATE OF CORRECTION

Patent No. 3,418,531 December 24, 1968

Richard W. Strachan

It is certified that error appears in the above identified patent and that said Letters Patent are hereby corrected as shown below:

Column 5, line 18, and column 6, line 13, "thermistor, said thermistor in a self-heating mode", each occurrence, should read -- thermistor in a self-heating mode, said thermistor --.

Signed and sealed this 17th day of March 1970.

(SEAL)
Attest:

Edward M. Fletcher, Jr.
Attesting Officer

WILLIAM E. SCHUYLER, JR.
Commissioner of Patents